July 5, 1966  G. HALBRITTER  3,259,553
PARALLEL DISTILLATION OF LIQUID-ORGANIC-WATER MIXTURES
Filed March 7, 1963
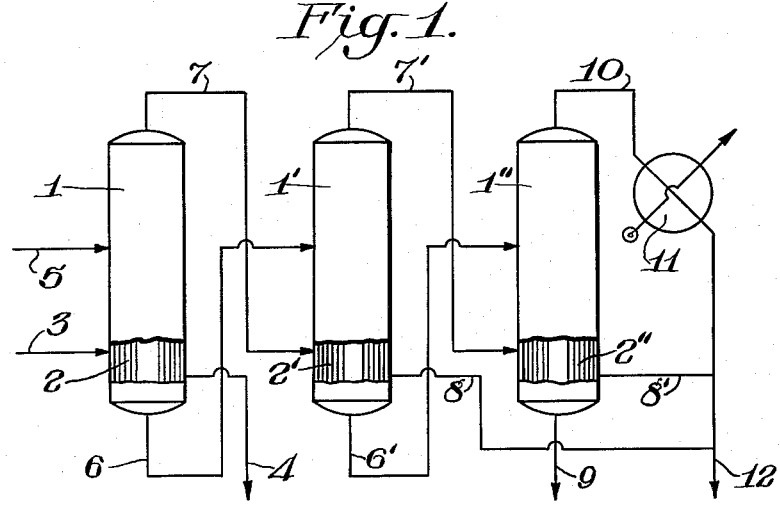
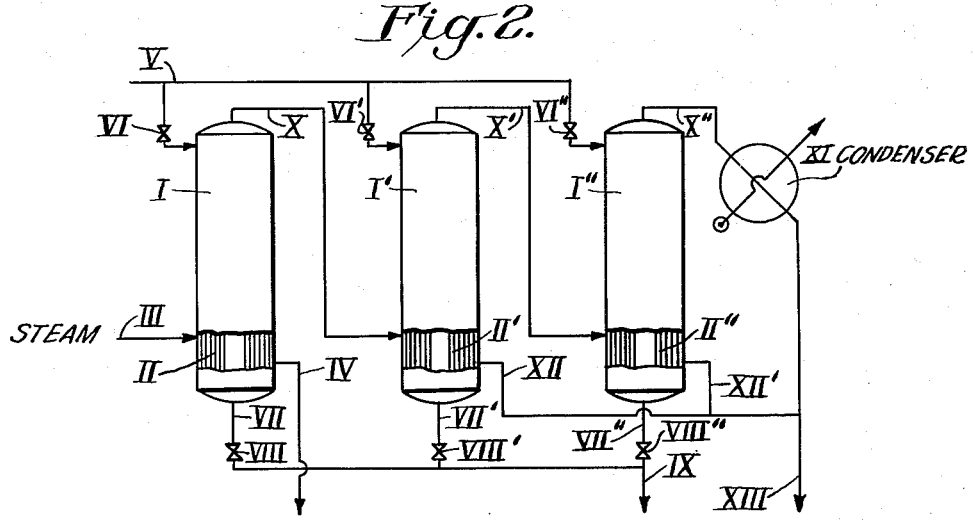
INVENTOR
Gustav Halbritter
BY Connolly and Hutz
ATTORNEYS

United States Patent Office 3,259,553
Patented July 5, 1966

3,259,553
PARALLEL DISTILLATION OF LIQUID-ORGANIC-WATER MIXTURES
Gustav Halbritter, Krefeld-Bockum, Germany, assignor to Farbenfabriken Bayer Aktiengesellschaft, Leverkusen, Germany, a German corporation
Filed Mar. 7, 1963, Ser. No. 263,451
Claims priority, application Germany, Mar. 16, 1962, F 36,290
1 Claim. (Cl. 203—14)

The present invention is concerned with a new or improved rectifying process.

It is known to rectify liquid mixtures of low and high boiling components, mainly difficulty separatable, especially alcohol-water mixtures, in several successively connected columns, whereby the heat of condensation and a part of the perceptible heat of the vapours of the more volatile components of the mixture to be rectified withdrawn at the head of one column can be utilized, with the help of a heat exchanger, for the indirect heating of the sump of the next column.

Such plants function according to the flow diagram shown in FIGURE I of the accompanying drawings, with, for example, columns 1, 1', 1'' with heat exchangers 2, 2', 2''. The heat exchanger 2 of the column 1 is heated, for example, by fresh steam which enters at 3 and the condensate of which runs off at 4. The column 1 is supplied with the mixture to be rectified through pipe 5. At 6, the less volatile components of the already partially rectified starting mixture are drawn off as sump and passed on to column 1', while the vapours withdrawn at 7 from the head of column 1 serve for the heating of heat exchanger 2' of column 1', the condensate of which runs off at 8. The sump of column 1' is passed, via pipe 6', to the next column 1'', while the vapours withdrawn at 7' from the head of column 1' serve for the heating of heat exchanger 2'' of column 1'', and so forth. In the case of the last column, the final sump product is obtained at 9 and the final vapours at 10, which are condensed in cooler 11 and can be combined and led off with the condensates 8 and 8' from heat exchangers 2 and 2''.

I have now found that the heat of condensation and a part of the perceptible heat of the vapours of the more volatile components obtained by the rectification of liquid mixtures can, in a suitable manner, also be advantageously utilized when several columns are connected together in parallel and the absolute pressure of each column decreasingly adjusted by throttles at the inlet and outlet.

Such a process functions according to the flow diagram shown in FIGURE II of the accompanying drawings. The plant again consists, for example, of three columns I, I' and I'' with heat exchangers II, II', II'', whereby heat exchanger II is again supplied at III, for example, with fresh steam, the condensate of which runs off at IV. However, the three columns I, I' and I'' are now supplied at the head of the columns or at any other desired point from a common pipe V, via valves VI, VI' and VI'', with the mixture to be rectified in a predetermined ratio, while the condensates VII, VII' and VII'' are removed as sump products, via valves VIII, VIII' and VIII'', through a common exit pipe IX. The vapours of column I are withdrawn at X at the head and serve for the heating of heat exchanger II' of column I', and, correspondingly, the vapours of column I' are withdrawn via X' for the heating of heat exchanger II' of column I''. The vapours of column I'' escape at X'', are condensed in condenser XI and combined with the condensates XII and XII' of heat exchangers II' and II'' in a common pipe XIII and led off.

By a correspondingly controlled release of pressure of the vapour condensates and a throttling of valves VI, VI' and VI'', on the one hand, and VIII, VIII' and VIII'', on the other hand, the absolute pressure in the columns I, I' and I'' can thereby be adjusted in such a manner that the pressure in column I is so much higher than the pressure in column I' and this, in turn, so much higher than that in column I'', that the temperature gradient, corresponding to these pressures, of the vapours X and X' withdrawn from columns I and I' to the sump temperature in columns I' and I'' is sufficient, in each case, to rectify the starting mixture supplied in these columns. If desired, the temperature of the vapours drawn off at X and X', and possibly also X'', can thereby be increased in each case, before entry into evaporator II' or II'', or evaporator II, by known vapour compression. Furthermore, the condensate collected at XIII can again be charged as reflux at the head of columns I, I' and I'' for the concentration of the more volatile components taken off at the head of evaporation columns I, I' and I''.

The heat which may still be required for the functioning of columns I' and I'' and/or I can, if desired, be supplemented by a controlled supply of suitable amounts of fresh steam directly to the columns, insofar as the runoff is discarded, or in separate heat exchangers.

A further utilization of heat can possibly also take place in that the heat of condensation of the vapours liberated by the release of pressure of the sump runoffs by valves VIII, VIII' and VIII'' and/or a part of the perceptible heat of these sump runoffs are used in known manner for the pre-heating of the supply of the column and/or of the sump of the same and/or of another column. Finally, the heat of condensation liberated in condenser XI and a part of the perceptible heat of the vapours of the readily volatile components (X'') taken off at the head of the last column (I'') can also be utilized in the same way.

The process according to the invention is particularly suitable for the rectification of those mixtures in which the sump and head temperatures of the columns do not lie too far apart and in which no decomposition occurs at the highest prevailing temperature, i.e. in the sump of the first column. From the large number of binary, ternary and possibly still higher mixtures in which this is the case, there may be mentioned, by way of example, ethanol-water mixtures, butanol-water mixtures, acetaldehyde-water mixtures, crotonaldehyde-water mixtures, aniline-water mixtures, butanol residue mixtures, mineral oil fractions, and the like.

The following example is given for the purpose of illustrating the present invention:

*Example*

A total of 8824 parts by weight of an aniline-water mixture, containing about 3.5 to 3.6% by weight of aniline are equally distributed to 3 rectifying columns. Thus, each column is supplied at the head with 2941 parts by weight of this mixture. The pressure in the first column is 2.7 atmospheres, in the second column is 1.7 atmospheres and in the third column is 1.0 atmospheres. The temperatures corresponding to these pressures are, in the first column, about 132° C. in the sump and about 129° C. at the head, in the second column about 117° C. in the sump and about 114° C. at the head and in the third column about 102° C. in the sump and about 99 to 100° C. at the head. The vapours which are drawn off at the heads of all three columns contain about 11% of aniline. At the head of each column there are withdrawn about 954 parts by weight of vapour, making a total of about 2864 parts by weight. The vapours of the first column (temperature 129° C.) are supplied to the heat exchanger of the second column and condensed therein, whereby, as mentioned, they bring the sump of the second column to 117° C. The vapours of the second column (about 114° C.) serve for the heating of the heat exchanger of the third column (sump temperature about 102° C.). The vapours of the third column (about 99 to 100° C.) are condensed with water, while the heat exchanger of the first column is heated with steam. The water withdrawn from the sump of the columns, in each case about 1986 parts by weight, making a total of about 5959 parts by weight, only contains about 0.1% of aniline.

The condensed head product of all three columns are cooled and separated in a separating vessel into a lower layer, which consists of about 220.4 parts by weight of aniline and 11 parts by weight of water, and into an upper layer, which consists of about 93.6 parts by weight of aniline and about 2539 parts by weight of water. The upper layer of a total of about 2633 parts by weight, which has practically the same constitution as the starting mixture, is combined with 6191 parts by weight of starting mixture to give a total of about 8824 parts by weight and returned to the plant as described above.

The perceptible heat of the sump runoffs of the three columns and the condensed head products of the first two columns are used for the pre-heating of the column supply from 20 to about 99° C.

In the case of this process, the steam and water consumption decrease, in comparison with a one stage rectification, from 2550 kg./hour to 1228 kg./hour of steam and from 65 m.³/hour to 22.5 m.³/hour of water.

A further saving can also be achieved when either further rectification stages are subsequently connected and/or the vaporous components of the last column brought in known manner by vapour compression to such pressure and temperature levels that their heat of condensation can be utilized in the heat exchanger of the first column for the evaporation of the sump, or the mixture to be rectified is so distributed to the columns that, for example, in the last one, working with the lowest pressure, the largest amount is rectified and thereby the higher heat of evaporation of the additional heating steam is utilized at a lower pressure for the reduction of the heating steam consumption.

I claim:

A process of distilling liquid organic-water mixtures to separate the components by volatilization and condensation with utilization of the heat of condensation, said process comprising feeding the mixture in a parallel flow into the top of a plurality of heated distillation zones at successively reduced pressures from the initial zone to the last zone, withdrawing vapor in series flow from the top of each distillation zone and introducing it into condensing and heat exchange contact with the bottom of the succeeding distillation zone, discharging liquid residue in parallel flow from the bottom of the plurality of distillation zones, and withdrawing and condensing the vapors from said last distillation zone.

References Cited by the Examiner

UNITED STATES PATENTS

| | | | |
|---|---|---|---|
| 409,572 | 8/1889 | Gaunt | 159—17 |
| 2,565,568 | 8/1951 | McCants | 202—51 |
| 3,004,590 | 10/1961 | Rosenblad | 202—174 X |

FOREIGN PATENTS

| | | |
|---|---|---|
| 6,661 | of 1904 | Denmark. |
| 830,187 | 1952 | Germany. |

NORMAN YUDKOFF, *Primary Examiner.*

F. E. DRUMMOND, *Assistant Examiner.*